Patented June 7, 1932

1,861,711

UNITED STATES PATENT OFFICE

HENRY H. MORETON, OF SANTA MONICA, CALIFORNIA, ASSIGNOR OF ONE-THIRD TO O. B. ENGLISCH, OF CHICAGO, ILLINOIS, AND ONE-THIRD TO CHARLES F. CRAIG, OF LOS ANGELES, CALIFORNIA

MATERIAL AND PROCESS FOR NEUTRALIZING ACIDS IN OILS

No Drawing.  Application filed October 8, 1928.  Serial No. 311,245.

This invention is a material and process for use in purifying oils.

In the art of purifying oils it is common to subject the oil to an acid treatment, i. e. to the action of sulphuric acid for the purpose of bleaching and removing impurities which it has heretofore been impossible to eliminate by any other known method. But experience has shown that in the usual acid treatment the oil subsequent to the treatment is discolored to a greater or lesser extent, and many times sufficiently to greatly impair its commercial value.

One of the objects of the invention is to provide a mixture by means of which the acid remaining in oil which has been subjected to the acid treatment, may be neutralized and its color restored. A further object is to provide a mixture of the character described which may be quickly and easily produced and which can be manufactured at a very low cost.

The invention will be hereinafter fully set forth and particularly pointed out in the claims.

The mixture forming the subject matter of the invention consists of a mixture of caustic soda and silica. It is preferred to employ silica in the form of quartz which has been finely ground, so that it will pass through screens running from 400 to 200 mesh. Effective results have been obtained with quartz ground or powdered so as to pass through screens of 300 mesh. It is preferred to use the silica in the form of ground quartz because of its high purity and insolubility in any material which it normally encounters in the oils to be treated, but the invention is not limited in this particular because high grade sand ground or pulverized to the desired fineness will serve the same purpose.

Experience has demonstrated that excellent results are obtained with a mixture consisting of 1 gallon of caustic soda to 100 pounds of silica, but these proportions may be varied without departing from the spirit of the invention.

The caustic soda and the silica are mixed in any desired way, for instance, by placing the powdered silica in a suitable receptacle, and the pouring the caustic soda in liquid form over it. The two ingredients are stirred in a suitable or desired manner until they are thoroughly intermingled, and the material is then ready for use. In other words, it is a complete unitary substance which may be used alone or which may be combined with other substances for various oil purifying purposes, as may be desired.

By thoroughly mixing and intermingling the caustic soda and the silica, the silica becomes a carrier for the soda, largely because the soda finely coats the silica particles. In practice, a suitable quantity, depending upon the characteristics of the oil being treated is deposited in the oil, and the caustic soda, by reason of its disposition throughout the powdered silica is thoroughly and uniformly distributed throughout the oil, with the result that it neutralizes the sulphuric acid previously used in the oil, and which has not been otherwise removed.

The salt formed by the combination of the soda and the acid is quickly precipitated in the oil, and after the oil is allowed to stand for a short time, the precipitate may be removed by filtering, or by any other separating process which may be desired.

It will be understood that by introducing the caustic soda by means of the silica carrier at atmospheric temperature, there is not sufficient heat produced to bring about a reaction between the soda and the silica.

The advantages of the invention will be readily understood by those skilled in the art of purifying and reclaiming oils. In this connection, it will be noted that a very simple and inexpensive mixture has been produced by means of which the oil may be conveniently subjected to an alkaline treatment for the removal of excess sulphuric acid which normally burns and discolors the oil. A further advantage is that no great skill is required to produce the mixture, and that its use does not involve the employment of expensive and cumbersome apparatus.

Having thus explained the nature of the invention and described an operative manner of constructing and using the same, although without attempting to set forth all of the forms in which it may be made, or all of the forms of its use, what is claimed is:—

1. A material for neutralizing acid in oil which has been subjected to acid treatment comprising powdered non-absorbent silica, the particles of which are coated with caustic soda.

2. A material for neutralizing acid in oil which has been subjected to acid treatment comprising finely divided non-absorbent quartz, the particles of which are coated with caustic soda.

3. A material for neutralizing acid in oil which has been subjected to acid treatment comprising a dry powdered non-absorbent silica of not less than 400 mesh or more than 200 mesh, the particles of which are coated with caustic soda.

4. A material for neutralizing acid in oil which has been subjected to acid treatment comprising a dry powdered non-absorbent silica, the particles of which are coated with caustic soda, mixed in the proportion of one gallon of caustic soda to 100 pounds of silica.

5. The method of subjecting acid treated oil to an alkaline treatment comprising depositing into the oil a quantity of finely powdered silica, the particles of which are coated with caustic soda, allowing the same to settle, and separating the oil from the residue.

6. The method of neutralizing acid in acid treated oil comprising depositing in the oil a mixture of powdered silica and caustic soda in the proportion of 1 gallon of soda to 100 pounds of silica, allowing the same to settle, and separating the oil from the residue.

7. The method of neutralizing acid in acid treated oil comprising grinding quartz to a degree of not less than 400 mesh and not exceeding 200 mesh, pouring caustic soda over the silica and agitating the mixture until the particles of silica are coated with caustic soda, depositing the mixture in oil and allowing it to settle, and then separating the oil from the residue.

In testimony whereof I have hereunto set my hand.

HENRY H. MORETON.